(12) United States Patent
Büttner et al.

(10) Patent No.: US 7,732,970 B2
(45) Date of Patent: Jun. 8, 2010

(54) ROTOR FOR AN ELECTRIC MACHINE

(75) Inventors: Hubertus Büttner, Bad Kissingen (DE); Marcus van Heyden, Dittelbrunn (DE); Markus Deutel, Werneck (DE); Alfons Vollmuth, Dittelbrunn-Hambach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 650 days.

(21) Appl. No.: 11/439,151

(22) Filed: May 23, 2006

(65) Prior Publication Data

US 2006/0267447 A1    Nov. 30, 2006

(30) Foreign Application Priority Data

May 31, 2005    (EP)    ................... 05011670

(51) Int. Cl.
  *H02K 1/00*    (2006.01)
(52) U.S. Cl. ................ 310/216.004; 310/216.136
(58) Field of Classification Search ............ 310/216, 310/217, 218
  See application file for complete search history.

(56) References Cited

U.S. PATENT DOCUMENTS 5,942,831 A * 8/1999 Yamada et al. .............. 310/217
6,362,553 B1 * 3/2002 Nakahara et al. ............ 310/254
7,049,726 B2 * 5/2006 Nakahara et al. ............ 310/217
7,138,742 B2 * 11/2006 Arimitsu et al. ............. 310/217

FOREIGN PATENT DOCUMENTS

| DE | 199 43 050 | 3/2001 |
|---|---|---|
| DE | 100 40 978 | 3/2002 |
| DE | 102 26 572 | 1/2004 |
| DE | 102 28 224 | 3/2004 |
| EP | 1 396 921 | 3/2004 |
| EP | 1 503 485 | 2/2005 |
| SU | 508872 | 3/1976 |

OTHER PUBLICATIONS

Examination Report dated Nov. 4, 2005 corresponding to European Application No. 05011670.6-2207.
Examination Report dated Oct. 25, 2007 issued for the corresponding European Patent Application No. 05 011 670.6.

* cited by examiner

*Primary Examiner*—Nguyen N Hanh
(74) *Attorney, Agent, or Firm*—Cohen Pontani Lieberman & Pavane LLP

(57) ABSTRACT

A rotor for an electric machine includes a rotor carrier having a cylindrical axial support portion which extends axially with respect to an axis of rotation of the rotor, a sheet pack which includes a plurality of lamellar sheets and is attached to the axial support portion at an attachment area, and a first weld in the sheet pack at a predetermined distance away from the attachment area to fasten a plurality of the lamellar sheets together.

13 Claims, 2 Drawing Sheets

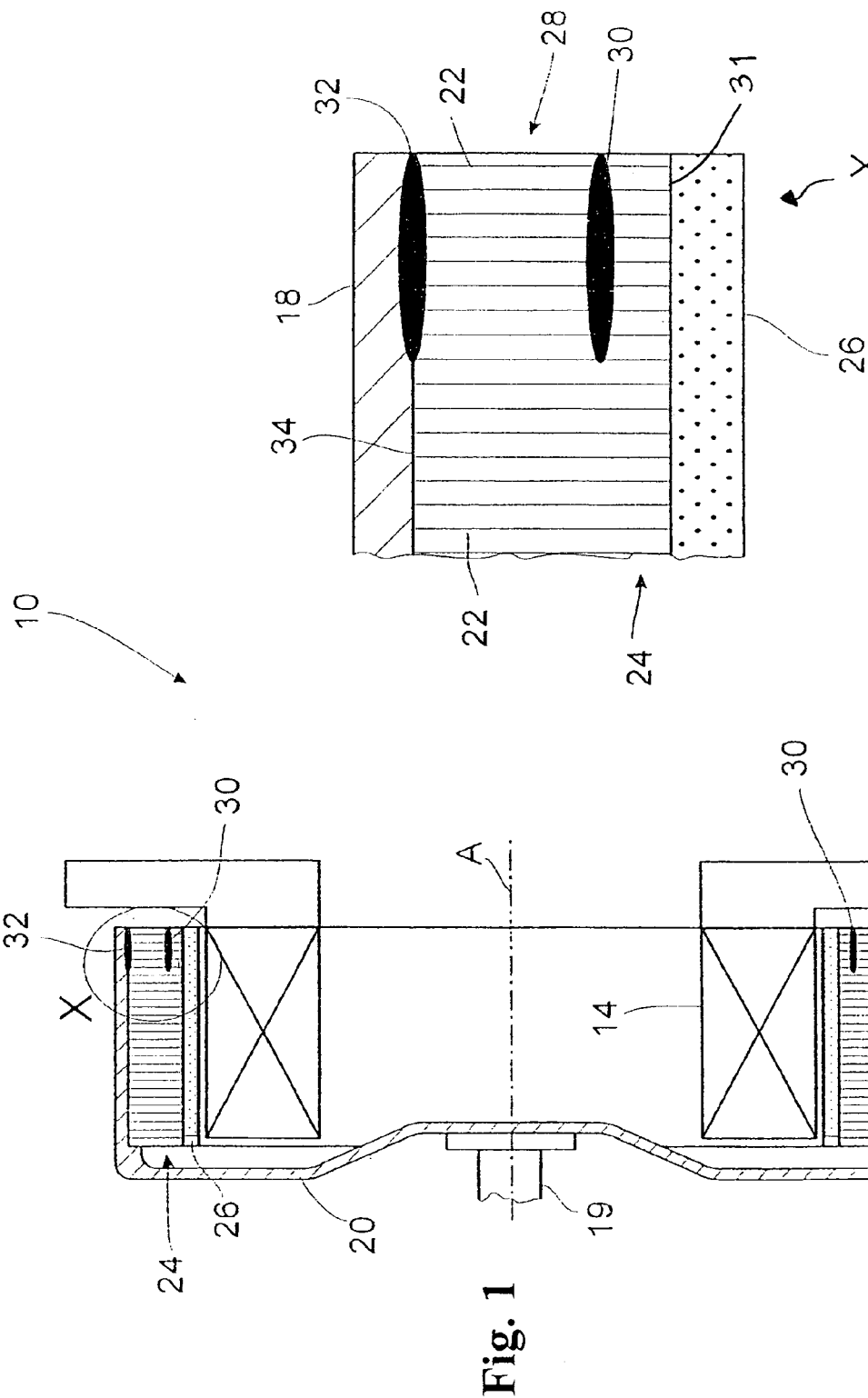

ROTOR FOR AN ELECTRIC MACHINE

BACKGROUND OF THE INVENTION

1. Field of the Invention

The invention relates to a rotor for an electric machine.

2. Description of the Related Art

Rotors of this type often have a rotor carrier with a disk-like support portion extending in the radial direction and a cylindrical axial support portion, on which a sheet pack consisting of lamellar electrical sheets is attached. The sheet pack can carry a coil winding or a plurality of permanent magnets, or it may not have any additional elements at all, and functions as the rotor of a reluctance machine while guiding the magnetic flux inside the rotor. The sheet pack is usually attached to the cylindrical axial support portion of the rotor carrier by a process such as pressing, adhesive bonding, caulking, or welding, as described in, for example, DE 102 26 572 A1.

During the operation of the electric machine, the rotor is subjected to extreme forces; in particular, the centrifugal forces acting on a cup-shaped rotor supported axially on one side can cause the open end to expand. In the case of rotors having a large diameter and/or rotors which operate at high revolutions per minute, at least some of the individual lamellar sheets can be spread apart or become laterally displaced or, in the extreme case, the entire sheet pack can break apart. Various types of mechanical vibration modes of the rotor are also associated with this behavior. Taken alone or in conjunction with the effects of the associated electromagnetic coupling between the rotor and the stator, these vibrations are accompanied by clearly noticeable, unpleasant running noises such as shrill whistling tones. The disadvantageous effects, however, are not limited to the electric machine alone but can also involve elements which are in working connection with the rotor, such as the crankshaft and its bearings in the case of a vehicle drive system consisting of an internal combustion engine and an electric motor, in which the rotor is connected non-rotatably to the crankshaft. In this case, the vibrations of the rotor of the electric machine can be superimposed with the vibrations of the crankshaft, which occur as a result of the periodic combustion process, in such a way that the two units start to vibrate in resonance with each other. The units can thus be prematurely damaged and can therefore fail a significant period before the end of their anticipated service life.

To counteract this problem, which has been known for many years, the common practice is to make the overall rotor very heavy, especially when it is cup-shaped, or at least to provide reinforcing elements in certain areas, preferably in the area of the open end of the cup, to prevent the sheet pack from spreading radially apart. A collar, for example, can be provided at the open end to act as a reinforcing element. These measures, all of which are familiar to the person of ordinary skill in the art, solve the problem by increasing the strength of the components and by shifting the occurring resonance frequencies as far as possible outside the nominal speed range. However, at the same time the mass of the rotor and its moment of inertia are considerably increased, which is generally undesirable for the application mentioned above.

SUMMARY OF THE INVENTION

Proceeding from this background, it is an object of the present invention to stiffen a rotor of the general type in question without the use of additional elements in order to lower or minimize the previously mentioned disadvantages.

The rotor according to the present invention includes a rotor carrier having a cylindrical axial support portion extending axially with respect to an axis of rotation of the rotor and a sheet pack including a plurality of lamellar sheets attached to the axial support portion at an attachment area. A first weld is provided within the sheet pack at a predetermined distance away from the attachment area for fastening the plurality of lamellar sheets together.

Even in the case of a sheet pack fastened to the rotor carrier by means of an adhesive, the sheet pack can be effectively prevented from spreading apart and the individual lamellar sheets prevented from becoming laterally displaced from each other by providing a first weld at a point within the radial dimension of the sheet pack and at a predetermined distance away from the area where the lamination pack is fastened to the cylindrical support area. This first weld connects a plurality of laminations to each other. The weld is preferably introduced axially into the sheet pack and can be located inside the volume of the sheet pack or on an exposed surface thereof.

According to an advantageous embodiment of the invention, a rotor which is open on one side and which has only a radial support portion can be stiffened very effectively by providing the first weld on the end surface of the sheet pack facing away from the radial support portion.

It has been found that good results are achieved by providing the first weld a certain distance away from the surface of the sheet pack which faces away from the attachment area. In this way, the surface of the sheet pack facing away from the rotor carrier is not negatively affected with respect to its structure or properties. Especially in the case of a synchronous machine excited by permanent magnets, the areas which hold the permanent magnets can therefore be given a precisely defined geometry.

It is especially advantageous for the first weld to be located within the volume of the sheet pack at a point at least 3 mm from the surface opposite the cylindrical axial support portion. At this distance, the electrical field induced in the sheet pack by the stator winding is relatively weak, as a result of which the lamellar sheets which have been electrically short-circuited by the weld represent only a negligible source of parasitic eddy currents. The efficiency of the electric machine is therefore not significantly affected.

The strength of the rotor can be increased even more by designing the weld so that it forms a closed ring in the circumferential direction of the sheet pack.

An even greater improvement in the stiffening effect can be obtained when, in addition to the previously described first weld, the sheet pack is fastened to the cylindrical axial support portion of the rotor carrier by means of a second weld. This second weld will fasten the sheet pack to the rotor carrier in a very strong and reliable manner.

When each of the first and second welds connects to each other lamellar sheets which are common to both welds, a strength is achieved which can otherwise be obtained only, for example, by means of an additional, mass-increasing collar area or similar measure. In this way, the centrifugal forces acting especially on the rotor carrier can be absorbed at least partially by the welded part of the sheet pack, and the sheet pack can be prevented from spreading apart over the long term. This design makes it possible for the rotor carrier to be designed in an especially light-weight manner with the lowest possible moment of inertia.

It has been found that even relatively short second welds with an axial dimension of at least approximately 4 mm have a considerable stiffening effect on the rotor.

A laser welding method is especially suitable as a way of producing the two welds. The ability to focus a laser beam very sharply and the great depth of penetration of a laser beam can be exploited as desired to produce a suitably narrow melt zone with tightly drawn local boundaries.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 1 shows a schematic cross-section of a synchronous machine having a cup-shaped rotor;

FIG. 2 is an enlargement of the circled portion of FIG. 1; and

DETAILED DESCRIPTION OF THE PRESENTLY PREFERRED EMBODIMENTS

Figure 3:
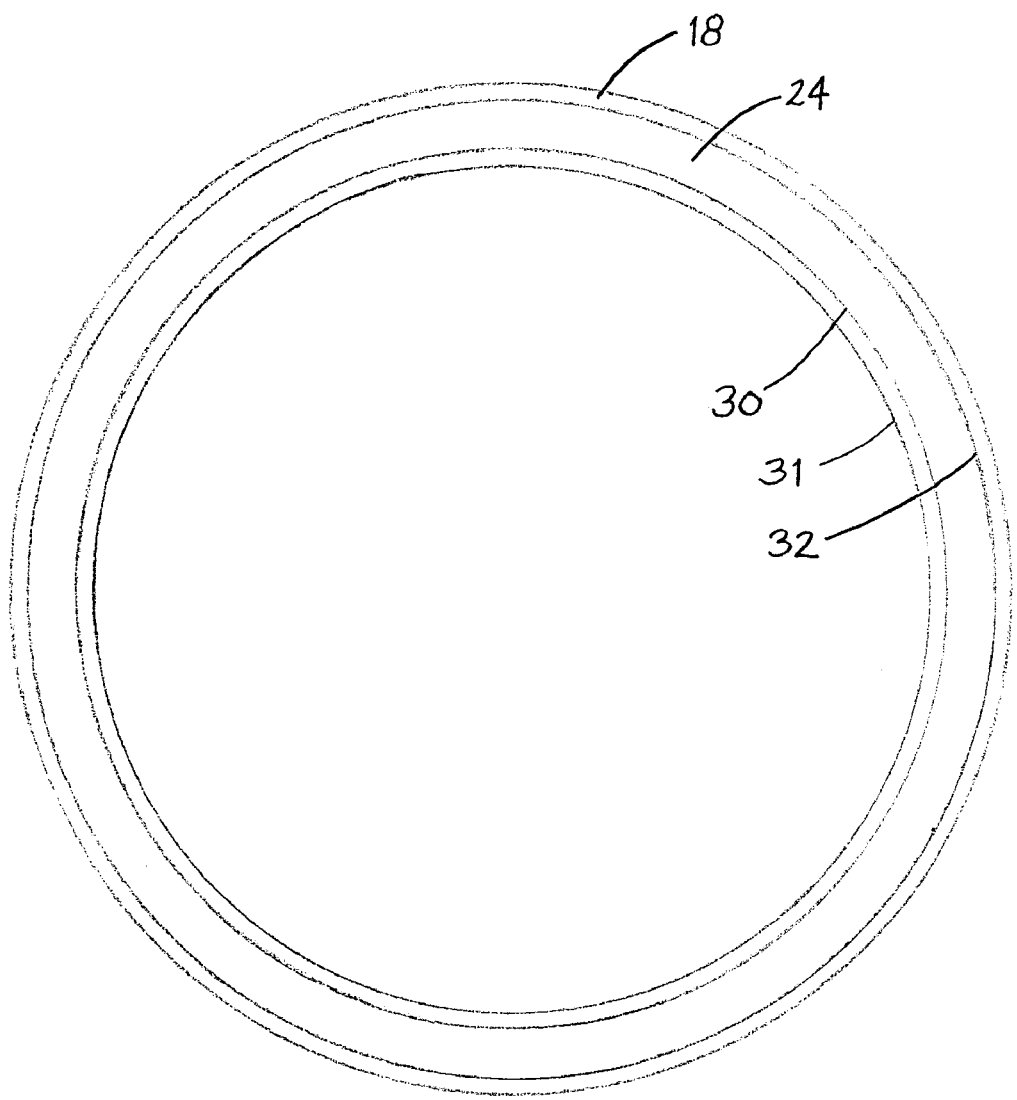
FIG. 3 is a plan view of the rotor showing the first and second welds, wherein the welds are formed as closed rings.

FIG. 1 shows an axial cross section through a synchronous machine 10 of the type having an external rotor, excited by permanent magnets, with a cup-shaped rotor 12, which encloses a stator 14 shown only in schematic fashion. The rotor rotates around an axis of rotation A and thus around the stator 14. The rotor 12 has a rotor carrier 16, formed of relatively thin-walled steel sheet, with a cylindrical axial support portion 18 extending axially with respect to the axis of rotation A, and with an adjacent radial support portion 20, which connects the carrier to shaft 19. The cylindrical axial support portion 18 holds in its interior a conventional stamped sheet pack 24 consisting of a plurality of lamellar sheets 22 (see also FIG. 2). The inside circumferential surface 31 of the sheet pack 24 carries a plurality of permanent magnets 26, which interact electromagnetically with the stator 14 during the operation of the electric machine 10.

The sheet pack 24 is initially attached to the support portion 18 in the conventional manner by pressing, shrink-fitting, adhesive bonding, or the like. To achieve an especially firm arrangement which stiffens the rotor 12 which is supported on one side, two welds 30, 32 are provided at the end surface 28 of the rotor 10 facing away from the radial support portion 20. These welds 30, 32 are produced by a laser welding process and have a length of approximately 4-6 mm in the axial direction. A first weld 30, which can be in the form of individual sections but is preferably in the form of a closed ring, extends within the radial dimension of the sheet pack 24 and at a predetermined distance away from the attachment area 34 where the sheet pack 24 is attached to the cylindrical axial support portion 18. The first weld 30 is preferably located within the volume of the sheet pack at a point at least 3 mm from the inside circumferential surface 31, as a result of which a plurality of lamellar sheets 22 are connected to each other.

A second weld 32 of approximately the same depth or length is provided at a predetermined radial distance away from this first weld 30 and parallel to it. This second weld 32 attaches the sheet pack 24 to the cylindrical axial support portion 18 of the rotor carrier 16. This weld 32 can also be in the form of individual sections or can be closed and continuous and thus extend around the entire circumference. It can be seen that the first weld 30 and the second weld 32 commonly connect several identical lamellar sheets 24 to each other. This greatly increases the strength of the rotor 12.

The invention is not limited by the embodiments described above which are presented as examples only but can be modified in various ways within the scope of protection defined by the appended patent claims.

What is claimed is:

1. A rotor for an electric machine comprising:
   a rotor carrier comprising a cylindrical axial support portion extending axially with respect to an axis of rotation of said rotor;
   a sheet pack comprising of a plurality of lamellar sheets, said sheet pack being attached to said axial support portion at an attachment area, said sheet pack having an inside circumferential surface radially opposite from said attachment area; and
   a first weld formed in said sheet pack at a predetermined radial distance away from said attachment area and at a predetermined radial distance away from said inside circumferential surface, wherein said first weld extends axially into said sheet pack through only some of said lamellar sheets.

2. The rotor of claim 1, wherein said rotor carrier further comprises a radial support portion extending radially with respect to said axis of rotation of said rotor; and said first weld is provided at an end surface of said sheet pack facing away from said radial support portion.

3. The rotor of claim 2, wherein said first weld has an axial length of 4-6 mm.

4. The rotor of claim 2 further comprising a second weld attaching said sheet pack to said rotor carrier at said attachment area, said second weld being provided at said end surface of said sheet pack.

5. The rotor of claim 4 wherein said second weld has an axial length of 4-6 mm.

6. The rotor of claim 4 wherein said second weld is produced by laser welding.

7. The rotor as claimed in claim 1, wherein said first weld is at least 3 mm from said inside circumferential surface of said sheet pack.

8. The rotor of claim 1, wherein said first weld forms a closed ring in the circumferential direction.

9. The rotor of claim 1, further comprising a second weld attaching said sheet pack to said cylindrical axial support portion of said rotor carrier.

10. The rotor of claim 9, wherein each of said first and second welds commonly connect several lamellar sheets to each other.

11. The rotor of claim 9, wherein said second weld has an axial dimension of at least 4 mm.

12. The rotor of claim 1, wherein said first weld is produced by laser welding.

13. The rotor of claim 1 further comprising a second weld attaching said sheet pack to said rotor at said attachment area, said second weld extending axially into said sheet pack through only some of said lamellar sheets.

* * * * *